US009469284B2

(12) United States Patent
Kubick et al.

(10) Patent No.: US 9,469,284 B2
(45) Date of Patent: Oct. 18, 2016

(54) METHOD AND APPARATUS FOR FACILITATING PERFORMANCE OF VEHICLE BRAKING SYSTEMS

(71) Applicant: Donelson Brake Systems, LLC, Clever, MO (US)

(72) Inventors: Damian Paul Kubick, Stockton, MO (US); Terrence Christopher Donelson, Springfield, MO (US); Michael James Donelson, Springfield, MO (US)

(73) Assignee: Donelson Brake Systems, LLC, Clever, MO (US)

( * ) Notice: Subject to any disclaimer, the term of this patent is extended or adjusted under 35 U.S.C. 154(b) by 414 days.

(21) Appl. No.: 13/935,666

(22) Filed: Jul. 5, 2013

(65) Prior Publication Data

US 2013/0293000 A1    Nov. 7, 2013

Related U.S. Application Data

(63) Continuation-in-part of application No. 12/080,188, filed on Apr. 1, 2008, now Pat. No. 8,505,695.

(51) Int. Cl.

| B60T 8/66 | (2006.01) |
| B60T 8/34 | (2006.01) |
| F16D 51/20 | (2006.01) |
| F16D 65/72 | (2006.01) |
| B60T 13/14 | (2006.01) |
| F16D 121/02 | (2012.01) |
| F16D 121/14 | (2012.01) |
| F16D 125/30 | (2012.01) |
| F16D 127/06 | (2012.01) |

(52) U.S. Cl.
CPC ............. *B60T 8/34* (2013.01); *B60T 13/143* (2013.01); *F16D 51/20* (2013.01); *F16D 65/72* (2013.01); *F16D 2121/02* (2013.01); *F16D 2121/14* (2013.01); *F16D 2125/30* (2013.01); *F16D 2127/06* (2013.01); *Y10T 29/49826* (2015.01)

(58) Field of Classification Search
CPC .... B60T 8/34; B60T 13/143; F16D 2121/02; F16D 2125/30; F16D 2127/06; F16D 65/72
USPC .............................. 303/167; 188/71.8, 196 A
See application file for complete search history.

(56) References Cited

U.S. PATENT DOCUMENTS

| 4,941,553 | A |   | 7/1990 | Harrison |
| 5,560,688 | A |   | 10/1996 | Schappler et al. |
| 5,646,848 | A | * | 7/1997 | Walenty ............... B60T 8/1725 303/155 |
| 6,050,655 | A | * | 4/2000 | Naito .................. B60T 8/17616 303/167 |
| 2002/0014959 | A1 |   | 2/2002 | Ludtke et al. |
| 2006/0266598 | A1 | * | 11/2006 | Baumgartner ........ F16D 55/226 188/72.7 |
| 2008/0303342 | A1 | * | 12/2008 | Kodaka ............... B60G 17/005 303/167 |
| 2009/0242337 | A1 | * | 10/2009 | Kubick .................. F16D 51/20 188/71.8 |

* cited by examiner

*Primary Examiner* — Robert A Siconolfi
*Assistant Examiner* — Mahbubur Rashid
(74) *Attorney, Agent, or Firm* — Armstrong Teasdale LLP (57) ABSTRACT

A vehicle anti-lock braking system includes at least one automatic hydraulic brake adjuster (AHBA) coupled in flow communication with at least one braking mechanism configured to interact with a vehicle wheel. The system also includes at least one pressure regulating device coupled in flow communication with the at least one AHBA. The system further includes at least one wheel speed sensor coupled to the vehicle wheel. The system also includes a control unit communicatively coupled to the at least one pressure regulating device and the at least one wheel speed sensor. The control unit is configured to actuate the at least one pressure regulating device at least partially as a function of the rotational speed of the vehicle wheel.

20 Claims, 6 Drawing Sheets

METHOD AND APPARATUS FOR FACILITATING PERFORMANCE OF VEHICLE BRAKING SYSTEMS

CROSS REFERENCE TO RELATED APPLICATIONS

This application is a continuation-in-part of U.S. patent application Ser. No. 12/080,188, filed Apr. 1, 2008, the contents of which are hereby incorporated by reference in their entirety.

BACKGROUND OF THE DISCLOSURE

The field of the disclosure relates generally to vehicle braking systems and, more particularly, to a vehicle anti-lock braking system including an automatic hydraulic brake adjuster (AHBA).

Some known vehicles include drum-type braking systems, including wedge-type braking systems. Such drum-type braking systems are frequently employed on large, off-road vehicles that include haul trucks and loaders. In general, drum-type braking systems require frequent calibration adjustments to maintain the associated vehicle stopping action above a predetermined threshold level. Moreover, the forces exerted on the braking systems associated with the larger, heavy-duty vehicles tend to shift the calibration of the braking systems more frequently than on smaller vehicles. Such frequent braking system maintenance decreases vehicle availability and increases total cost of ownership.

At least some known vehicles also include anti-lock braking systems. Such anti-lock braking systems control the braking pressure applied when the vehicle is braking to restrict a condition where the vehicle's wheels lock, i.e., where the wheel's rotation is arrested. However, at least some known anti-lock braking systems may not be compatible with service braking systems that include an AHBA.

BRIEF DESCRIPTION OF THE DISCLOSURE

In one aspect, a vehicle anti-lock braking system is provided. The system includes at least one automatic hydraulic brake adjuster (AHBA) coupled in flow communication with at least one braking mechanism configured to interact with a vehicle wheel. The system also includes at least one pressure regulating device coupled in flow communication with the at least one AHBA, the at least one pressure regulating device configured to regulate brake actuating pressure applied to the at least one braking mechanism through the at least one AHBA. The system further includes at least one wheel speed sensor coupled to the vehicle wheel, the at least one wheel speed sensor configured to sense a rotational speed of the vehicle wheel. The system also includes a control unit communicatively coupled to the at least one pressure regulating device and the at least one wheel speed sensor, the control unit configured to actuate the at least one pressure regulating device at least partially as a function of the rotational speed of the vehicle wheel.

In another aspect, a method of assembling a vehicle anti-lock braking system is provided. The method includes providing at least one automatic hydraulic brake adjuster (AHBA). The method also includes coupling the at least one AHBA in flow communication with at least one braking mechanism configured to interact with a vehicle wheel. The method further includes coupling at least one pressure regulating device in flow communication with the at least one AHBA. The method also includes positioning at least one wheel speed sensor proximate the vehicle wheel such that the at least one wheel speed sensor is configured to transmit signals substantially representative of a rotational speed of the vehicle wheel. The method further includes coupling a control unit in communication with the at least one pressure regulating device and the at least one wheel speed sensor.

In another aspect, a vehicle is provided. The vehicle includes a plurality of vehicle wheels. The vehicle also includes an anti-lock braking system. The anti-lock braking system includes at least one automatic hydraulic brake adjuster (AHBA) coupled in flow communication with at least one braking mechanism configured to interact with a vehicle wheel of the plurality of vehicle wheels. The system also includes at least one pressure regulating device coupled in flow communication with the at least one AHBA, the at least one pressure regulating device configured to regulate brake actuating pressure applied to the at least one braking mechanism through the at least one AHBA. The system further includes at least one wheel speed sensor coupled to the at least one pressure regulating device and the vehicle wheel, the at least one wheel speed sensor configured to sense a rotational speed of the vehicle wheel. The system also includes a control unit communicatively coupled to the at least one pressure regulating device and the at least one wheel speed sensor, the control unit configured to actuate the at least one pressure regulating device at least partially as a function of the rotational speed of the vehicle wheel.

DETAILED DESCRIPTION OF THE DISCLOSURE

Figure 1:
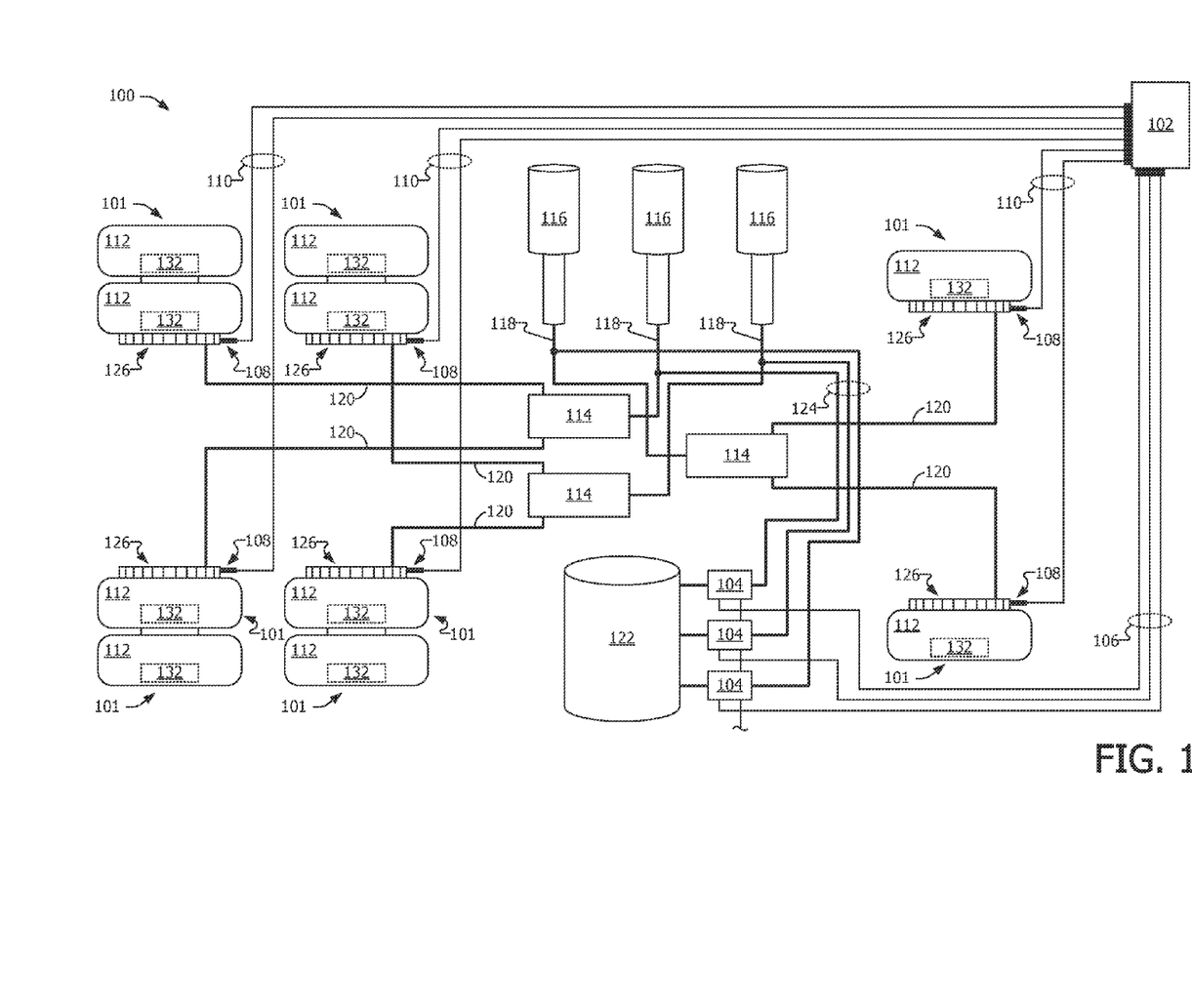
FIG. 1 is a schematic view of an exemplary vehicle anti-lock braking system.

FIG. 1 is a schematic view of an exemplary vehicle anti-lock braking system 100 for a vehicle 101. System 100 includes a control unit 102 communicatively coupled to a plurality of pressure regulating devices 104 through a plurality of respective first wire leads 106. Control unit 102 is also coupled to a plurality of wheel speed sensors 108 through a plurality of respective second wire leads 110. The plurality of pressure regulating devices 104 are used to regulate brake actuated pressure supplied to brake actuators 132. In the exemplary embodiment, vehicle 101 includes ten wheels 112. Alternatively, vehicle 101 has any number of wheels 112 that enables operation of anti-lock braking system 100 as described herein. Each wheel 112 includes a brake actuator 132 coupled thereto. Each of the plurality of wheel speed sensors 108 is coupled to a respective wheel 112 and is configured to sense the rotational speed associated with respective wheel 112. Control unit 102 is configured to actuate at least one of the plurality of pressure regulating devices 104 at least partially as a function of the rotational speed of wheel 112 as sensed by respective wheel speed sensor 108.

System 100 also includes a plurality of automatic hydraulic brake adjusters (AHBA) 114 and a plurality of pressure convertors 116. Each AHBA 114 is coupled in flow communication with one of the plurality of pressure converters 116 through a plurality of respective first hydraulic fluid conduits 118. Each AHBA 114 is further coupled in flow communication with brake actuators 132 through a plurality of respective second hydraulic fluid conduits 120. In the exemplary embodiment, each AHBA 114 is configured to operate in cooperation with the other AHBAs 114. In an alternative embodiment, system 100 may include any number of AHBAs 114 that enables operation of system 100 as described herein.

System 100 further includes a service brake pedal (not shown) that is coupled in flow communication with each of the plurality of pressure converters 116. In the exemplary embodiment, the service brake pedal is a standard floor brake, or treadle valve, that is configured for foot-operation and is typically found in most vehicles. Alternatively, the service brake pedal is any operable device that enables operation of system 100 as described herein. The service brake pedal is configured to cooperate with the plurality of pressure converters 116 to modulate flow of hydraulic braking fluid from the plurality of pressure converters 116 to respective AHBA 114.

System 100 further includes a hydraulic fluid reservoir 122 configured to store a predetermined volume of hydraulic braking fluid that is primarily used as a fluid supply and makeup source. Hydraulic fluid reservoir 122 is coupled in flow communication with each of the plurality of pressure converters 116 through one of the plurality of pressure regulating devices 104 and a respective fluid pressure release conduit 124.

System 100 also includes a plurality of trigger wheels 126. Each of the plurality of trigger wheels 126 is coupled to a respective wheel 112 and is configured to facilitate sensing the rotational speed of wheel 112 through the plurality of wheel speed sensors 108.

During operation, at least one of the plurality of wheel speed sensors 108 senses a reduction in the rotational speed of corresponding trigger wheel 126. When the sensed rotational speed reaches a predetermined threshold, at least one wheel speed sensor 108 transmits a corresponding signal to control unit 102. Control unit 102 then actuates at least one of the plurality of pressure regulating devices 104 inducing an amount of hydraulic braking fluid to flow from respective first hydraulic fluid conduit 118 to hydraulic fluid reservoir 122 through respective fluid pressure release conduit 124. Such fluid flow results in a corresponding decrease in brake actuated pressure supplied to respective brake actuator 132.

Control unit 102 is configured to regulate the decrease in brake actuated pressure to decrease the potential for establishing a wheel lock-up condition while braking, thereby controlling the frequency and duration of time that the plurality of pressure regulating devices 104 are actuated. As used herein, the term "lock-up condition" refers to a condition where the rotation of the wheel is substantially diminished, up to and including, a substantially full stop of rotation. In the exemplary embodiment, the plurality of pressure regulating devices 104 are at rest in a closed state where fluid communication between the fluid pressure release conduits 124 and hydraulic fluid reservoir 122 is obstructed. When actuated, the plurality of pressure regulating devices 104 are positioned to a fully open state, where fluid communication is established. The duration of time that one of the plurality of pressure regulating devices 104 is actuated is proportional to the amount of hydraulic braking fluid permitted to flow from first hydraulic fluid conduits 118 to hydraulic fluid reservoir 122 and, accordingly, is proportional to the decrease in brake actuated pressure supplied to brake actuators 132. In other embodiments, when actuated, the plurality of pressure regulating devices 104 are controllably positioned, i.e., throttled, to provide a predetermined decrease in brake actuated pressure supplied to brake actuators 132.

In the exemplary embodiment, system 100 may be configured to be installed as a retrofit package on vehicles currently in service. Alternatively, system 100 may be installed on new vehicles. An exemplary method of assembling a vehicle anti-lock braking system retrofit package includes assembling a braking mechanism, or braking actuators 132 having a first bias. The method also includes assembling at least one AHBA 114 having a second bias and a third bias. The method further includes coupling at least one AHBA 114 in flow communication with braking actuators 132 such that the second bias and the third bias cooperate with the first bias to facilitate modulating braking actuators 132 to predetermined positions.

Also, in the exemplary embodiment, control unit 102 includes a processor and a memory (neither shown). The memory includes at least one predetermined algorithm configured, when executed by the processor, to convert the signal received from at least one wheel speed sensor 108 into a speed indication substantially representative of a value of the rotational speed of respective wheel 112.

The term "processor", as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by the processor, including RAM memory, ROM memory, EPROM memory, EEPROM memory, and non-volatile RAM (NVRAM) memory. The above memory types are exemplary only, and are thus not limiting as to the types of memory usable for storage of a computer program.

Control unit 102 is programmed with sufficient instructions and algorithms to enable operation of system 100 as described herein. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Figure 2:
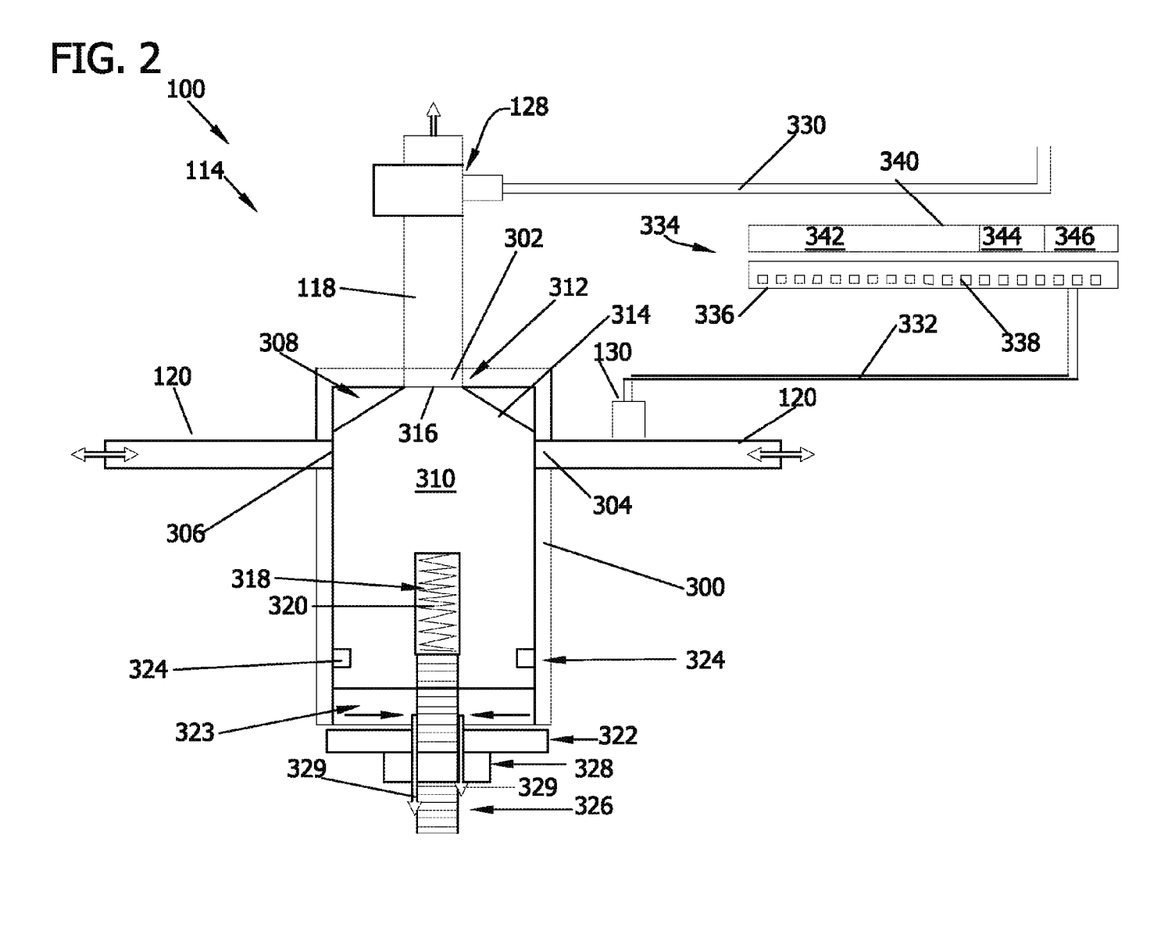
FIG. 2 is a schematic view of an exemplary automatic hydraulic brake adjuster (AHBA) that may be used with the vehicle anti-lock braking system shown in FIG. 1.

FIG. 2 is a schematic view of an exemplary AHBA 114 that may be used with vehicle anti-lock braking system 100. AHBA 114 includes a valve body 300 that at least partially defines a plurality of ports in relation to system 100. Specifically, while pressure converter 116 includes a first port (not shown), AHBA 114 includes a second port 302, a third port 304 and a fourth port 306. Valve body 300 also at least partially defines a cavity 308 and ports 302, 304, and 306 couple cavity 308 in flow communication with a hydraulic fluid pressure locking device 128 and brake actuators 132 (shown in FIGS. 1, 3, and 4), respectively.

Hydraulic fluid pressure locking device 128 is coupled in flow communication with at least one of the plurality of pressure converters 116 and at least one of the plurality of AHBAs 114 within conduit 118. In the exemplary embodiment, device 128 is a solenoid-operated valve that is electrically coupled to a manually-operated on/off switch (not shown) in a truck cab (not shown). Alternatively, device 128 is any device that enables operation of system 100 as described herein, including, but not limited to, a spring-loaded and orificed check valve. Device 128 is configured to perform as a wheel-locking device, or line lock, that facilitates locking a set of brakes on a particular axle 204 (shown in FIG. 6) for circumstances requiring momentary parking as compared to extended, or permanent, parking. Specifically, device 128 is configured to facilitate a substantially static hydraulic fluid pressure within a portion of vehicle anti-lock braking system 100 between brake actuators 132 and device 128. More specifically, device 128 includes a valve seat and valve disc (neither shown) that facilitate extended actuation of system 100 associated with a rear axle 204 in lieu of maintaining depression of the service brake pedal (not shown). Such action by device 128 enables operation associated with vehicle 101 that includes, but is not limited to, backing up, stopping to receive a load, and dumping a load.

AHBA 114 also includes a valve 310 positioned within cavity 308. Valve 310 includes a valve seat 312 that includes a beveled surface 314 and seating surface 316. Beveled surface 314 is configured to facilitate inducing the second bias within system 100 while brake actuators 132 are configured to induce the first bias into system 100 as discussed further below. Seating surface 316 is configured to mitigate fluid flow through port 302 when valve 310 is in the closed position. Valve 310 is configured to facilitate coupling fluid conduit 118 in flow communication with fluid conduits 120 through cavity 308 as a function of positioning of valve 310. In the exemplary embodiment, valve 310 cooperates with valve body 300 to form a substantially annular 0.127 millimeter (mm) (0.005 in.) clearance. Alternatively, any clearance that enables operation of system 100 as described herein is used.

Valve 310 defines a cavity 318 within valve 310. AHBA 114 further includes a spring 320 that is positioned within cavity 318 and is placed in contact with valve 310. Spring 320 is configured to induce the third bias within system 100.

AHBA 114 also includes a cylinder end cap 322 that is coupled to valve body 300. End cap 322 cooperates with valve body 300 to define cavity 318 and facilitates access to cavity 318 for insertion and removal of valve 310. Moreover, end cap 322, valve 310 and valve body 300 cooperate to define a neutral chamber 323 that is configured to collect small volumes of hydraulic fluid that may seep downward between valve body 300 and valve 310 into chamber 323. AHBA 114 further includes a seal 324 that facilitates mitigating seepage of fluid from a portion of cavity 308 between seal 324 and port 302 into chamber 323. Mitigating such seepage facilitates maintaining a predetermined differential pressure across valve 310, thereby facilitating positioning of valve 310 to predetermined positions as a function of desired operation of brake actuators 132. End cap 322 also facilitates access to cavity 318 for inspection and replacement of seal 324.

In the exemplary embodiment, AHBA 114 also includes a brake adjustment screw 326 that extends through end cap 322 into cavity 318 such that it is coupled to spring 320. Screw 326 is configured to adjust a tension within spring 320, and therefore, facilitates adjusting the third bias within system 100. Screw 326 is held in place by a locknut 328. Alternatively, an adjustment device (not shown) that is part of a dynamic, automatic adjustment scheme (not shown) is used. In such an alternative embodiment, a controller such as control unit 102 (shown in FIG. 1) is coupled in electronic data communication with at least one pressure sensing device 130 and the adjustment device. Such adjustment device is operated based at least partially in response to pressure conditions within conduits 120.

At least one pressure sensing device 130 is coupled in flow communication with each of conduits 120 (only one shown in FIG. 2). In the exemplary embodiment, device 130 is a standard fluid pressure transmitter that is configured to sense fluid pressure in the associated conduit 120 and generate and transmit an electronic signal proportional to such pressure. Alternatively, any pressure sensing device that enables operation of system 100 as described herein is used. Also, in the exemplary embodiment, device 130 is configured with a pressure sensing range of approximately 0 kPa (0 psi) to approximately 27,580 kPa (4000 psi). Alternatively, device 130 is configured to sense pressure in any range. Moreover, in the exemplary embodiment, the electronic signal is transmitted to output devices (discussed further below) that facilitate delivery of operational indications associated with system 100 to a vehicle operator. Alternatively, the electronic signal is transmitted to control unit 102 for facilitating control of devices that include, but are not limited to, the plurality of AHBA 114.

In the exemplary embodiment, screw 326, locknut 328, and end cap 322 are configured to cooperate in forming at least one channel (not shown) that facilitates fluid removal from chamber 323. In the exemplary embodiment, the channel is approximately 1 millimeter (mm) (0.040 in.) to 1.27 mm (0.050 in.) in diameter. Alternatively, any dimensions that enable operation of system 100 as described herein are used. Such fluid removal (as illustrated by arrows 329) facilitates maintaining a predetermined differential pressure across valve 310, thereby facilitating positioning of valve 310 to predetermined positions as a function of desired operation of brake actuators 132.

FIG. 2 also illustrates a plurality of electrical wires 330 and 332 that transmit electrical power and electrical and electronic signals between an electrical power source (not shown) and a controller, such as control unit 102, and devices 128 and 130, respectively. Moreover, system 100 further includes at least one hydraulic fluid pressure indicating instrument 334 that is positioned within the operator cab and is coupled in electrical communication with pressure sensing device 130. In the exemplary embodiment, each of second hydraulic fluid conduits 120 have an associated pressure instrument 334. Alternatively, any configuration of pressure sensors 130 and instruments 334 is used that enables operation of system 100 as described herein. Instrument 334 includes a light emitting diode (LED) array 336 that includes a plurality of LEDs 338. Instrument 334 also includes a pressure chart 340 that includes a red (low)

pressure range 342, an intermediate (amber) pressure range 344 and a high (green) pressure range 346. Instrument 334 is configured such that as hydraulic fluid pressure within an associated conduit 120 increases, a greater number of LEDs 338 are energized. Moreover, instrument 334 is configured to indicate to an operator that fluid pressure is low when only LEDs 338 under range 342 are energized. Similarly, instrument 334 is configured to indicate to an operator that fluid pressure is within an intermediate range and a high range when LEDs 338 under the associated ranges are energized. Typically, a pressure indication in green range 346 indicates greater than 26,890 kPa (3900 psi) which is considered sufficient for operation of system 100. Alternatively, any pressure indication instrument is used that enables operation of system 100 as described herein, including, but not limited to digital numerical indicators and analog mechanical pressure gauges.

In operation, valve 310 is positioned as a function of a plurality of forces and biases applied through system 100. Typically, with the service brake pedal (not shown) fully released, hydraulic fluid pressure within conduit 118 is approximately 0.0 kPa (0.0 psi) and increases to approximately 27,580 kPa (4000 psi) when the service brake pedal is fully depressed. Such an increase in fluid pressure in fluid conduit 118 is transmitted to valve seating surface 316 of valve seat 312 through port 302 and induces a downward, or opening, force which tends to induce a downward, or opening, movement of valve 310. As valve 310 opens, hydraulic fluid is channeled from conduit 118 into cavity 308. The fluid entering cavity 308 induces the second bias of system 100 by exerting a pressure upon beveled surface 314 of valve seat 312. The second bias is at least partially directly proportional to a predetermined surface area of beveled surface 314 that receives the pressure of the hydraulic fluid contacting surface 314.

Also, in operation, opening of valve 310 as described above facilitates compression of spring 320 against both a portion of valve 310 and a portion of screw 326, both within cavity 318. Compression of spring 320 induces the third bias in system 100, where the third bias is at least partially directly proportional to a spring constant of spring 320 and a distance of compression. In the exemplary embodiment, the third bias of system 100 may be adjusted by operation of adjusting screw 326. Specifically, insertion of screw 326 into cavity 318 increases spring compression which subsequently increases the third bias proportionately. Similarly, retraction of screw 326 from cavity 318 decreases spring compression which subsequently decreases the third bias proportionately. Locknut 328 is loosened and subsequently retightened to allow operation of screw 326. Alternatively, an adjustment device that is part of a dynamic, automatic adjustment scheme receives control signals from the controller, such as control unit 102 (shown in FIG. 1), and the adjustment device is operated based at least partially in response to pressure conditions within conduits 120.

Further, in operation, opening movement of valve 310 uncovers ports 304 and 306, thereby coupling ports 304 and 306 in flow communication with cavity 308 such that fluid is channeled into conduits 120 from conduit 118 through cavity 308. Until ports 304 and 306 are uncovered, a substantially static hydraulic fluid pressure value of approximately 276 kPa to 552 kPa (40 psi to 80 psi) is present. Alternatively, any range and values of hydraulic fluid pressure may be used that enables operation of anti-lock braking system 100 and AHBA 114 as described herein. Therefore, in a manner similar to conduit 120 and cavity 308, increased fluid pressure is exerted within conduits 120 up to 27,580 kPa (4000 psi) with the service brake pedal (not shown) fully depressed and braking action of actuators 132 is increased. The rate and range of opening of valve 310 is at least partially dependent upon the value of the first, second, and third biases of system 100 as well as hydraulic fluid pressure within conduit 118 and cavity 308.

Similarly, in operation, a decrease in fluid pressure in fluid conduit 118 as induced by relaxation of the service brake pedal is transmitted to valve seating surface 316 of valve seat 312 through port 302. The second bias, that is proportional to a predetermined surface area of beveled surface 314 and the pressure of the hydraulic fluid contacting surface 314, decreases due to the decrease in fluid pressure. The third bias, as a function of at least partially compressed spring 320, induces an upward, or closing, force which tends to induce an upward, or closing, movement of valve 310. Moreover, the fluid pressure exerted within conduits 120 is initially decreased such that the braking action of actuators 132 is decreased.

Also, in operation, as valve 310 closes, ports 304 and 306 are closed off by valve 310, where the braking action, or deceleration, of wheels 112 (shown in FIG. 1) and axle 204 (shown in FIG. 6) is decreased to substantially zero as the fluid pressure within conduits 120 attains a substantially static value of approximately 276 kPa to 552 kPa (40 psi to 80 psi). Such static pressures within conduits 120 are at least partially a function of the rate of closure of valve 310, which is partially a function of spring 320 compression. Subsequently, depending upon the value of the fluid pressure in conduit 118, valve seating surface 316 closes off port 302. Operation of device 128, as described above, may be used to control the rate of decrease in pressure of the fluid in conduit 118, thereby at least partially controlling the rate of closing of valve 310. Therefore, the rate and range of closing of valve 310 is at least partially dependent upon the value of the first, second, and third biases of system 100 as well as the employment of device 128.

Moreover, in operation, seal 324 mitigates fluid seepage into chamber 323 and fluid that collects in chamber 323 is channeled through passages formed by screw 326, locknut 328, and end cap 322. Such fluid removal facilitates maintaining a predetermined differential pressure across valve 310, thereby facilitating positioning of valve 310 to predetermined positions as a function of desired operation of brake actuators 132. Furthermore, pressure indicating instruments 334 indicate hydraulic fluid pressure within each hydraulic fluid conduit 120, thereby providing information to an operator with respect to the fluid pressure being transmitted to each of actuators 132.

Further, in operation, at least one of the plurality of wheel speed sensors 108 senses a reduction in the rotational speed of corresponding trigger wheel 126 (both shown in FIG. 1). When the sensed rotational speed reaches a predetermined threshold, at least one wheel speed sensor 108 transmits a corresponding signal to control unit 102 (shown in FIG. 1). Control unit 102 then actuates at least one of the plurality of pressure regulating devices 104 inducing an amount of hydraulic braking fluid to flow from respective first hydraulic fluid conduit 118 to hydraulic fluid reservoir 122 through respective fluid pressure release conduit 124. Such fluid flow results in a corresponding decrease in fluid pressure within conduit 118. The decrease in fluid pressure within conduit 118 is transmitted to valve seating surface 316 of valve seat 312 through port 302. Accordingly, the second bias, that is proportional to a predetermined surface area of beveled surface 314 and the pressure of the hydraulic fluid contacting surface 314, decreases due to the decrease in fluid pressure. The third bias, as a function of at least partially compressed spring 320, induces an upward, or closing, force which tends to induce an upward, or closing, movement of valve 310. Moreover, the fluid pressure exerted within conduits 120 is initially decreased such that the braking action of actuators 132 is decreased.

Figure 3:
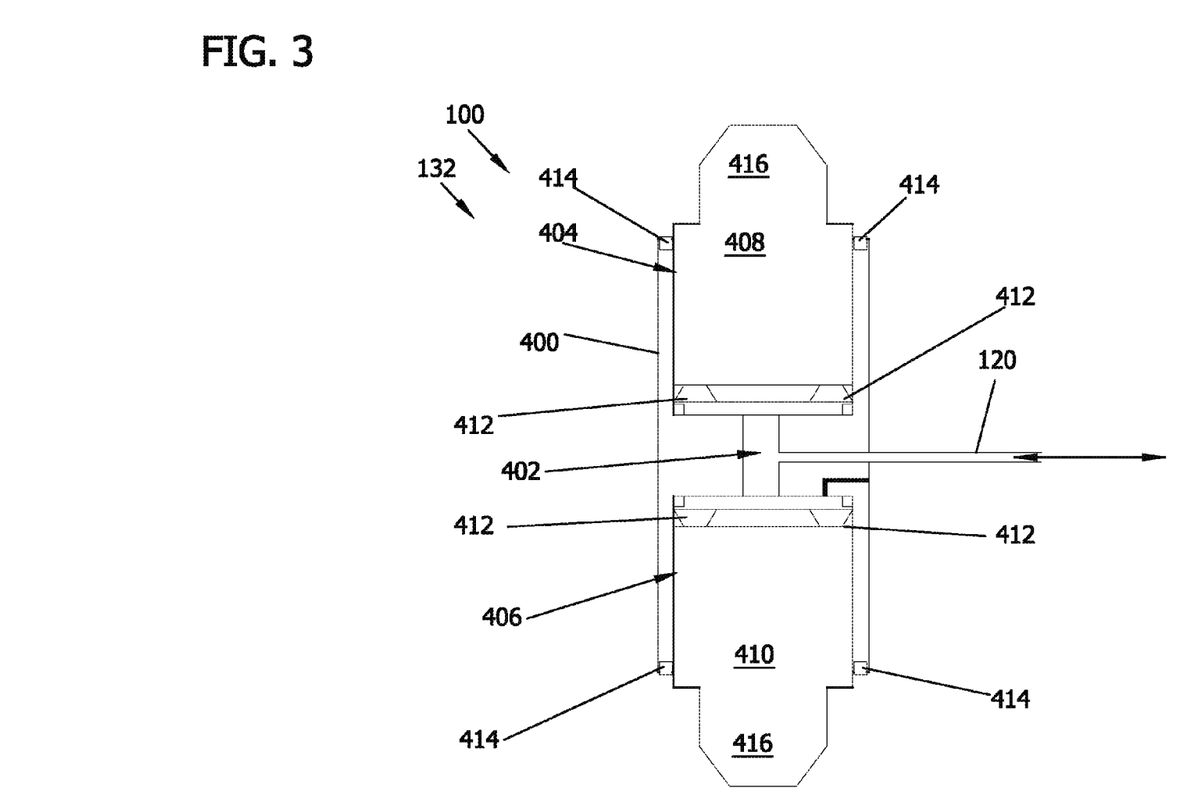
FIG. 3 is a schematic view of an exemplary brake actuator that may be used with the vehicle anti-lock braking system shown in FIG. 1.

FIG. 3 is a schematic view of an exemplary brake actuator 132 that may be used with vehicle anti-lock braking system 100. One of the plurality of second fluid conduits 120 is illustrated for reference. Actuator 132 includes an actuator body 400 that at least partially defines a fluid cavity 402 that is coupled in flow communication with hydraulic fluid conduit 120. Body 400 also at least partially defines a first piston cavity 404 and a second piston cavity 406. Actuator 132 also includes a first piston 408 and a second piston 410 that are received within cavities 404 and 406, respectively. Pistons 408 and 410 are configured to move inward and outward with respect to cavity 402 at least partially as a function of fluid pressure within cavity 402. Actuator 132 further includes a plurality of cup seals 412 and wiper seals 414, where seals 412 and 414 are configured to mitigate fluid leakage from cavities 404 and 406 to atmosphere as pistons 408 and 410 travel within cavities 404 and 406, respectively. Pistons 408 and 410 include piston extensions 416 that facilitate coupling pistons 408 and 410 to brake shoes and brake springs (neither shown in FIG. 3).

In operation, as fluid pressure in conduit 120 increases as a function of depression of the service brake pedal (not shown) as discussed above, the increased pressure is transmitted to the fluid in cavity 402. The increased pressure in cavity 402 induces a force against pistons 408 and 410, thereby inducing an outward movement of pistons 408 and 410, including extensions 416, against the first bias of system 100, that is, the associated brake springs (as discussed further below). The outward movement of pistons 408 and 410 increases the braking action of the vehicle as described above. Similarly, as fluid pressure in conduit 120 decreases as a function of relaxation of the service brake pedal as discussed above, the reduced pressure is transmitted to the fluid in cavity 402. The decreased pressure in cavity 402 reduces the induced force against pistons 408 and 410, thereby inducing an inward movement of pistons 408 and 410, and extensions 416, as a function of the first bias of system 100 associated with the brake springs. The inward movement of pistons 408 and 410 decreases the braking action of the vehicle.

Figure 4:
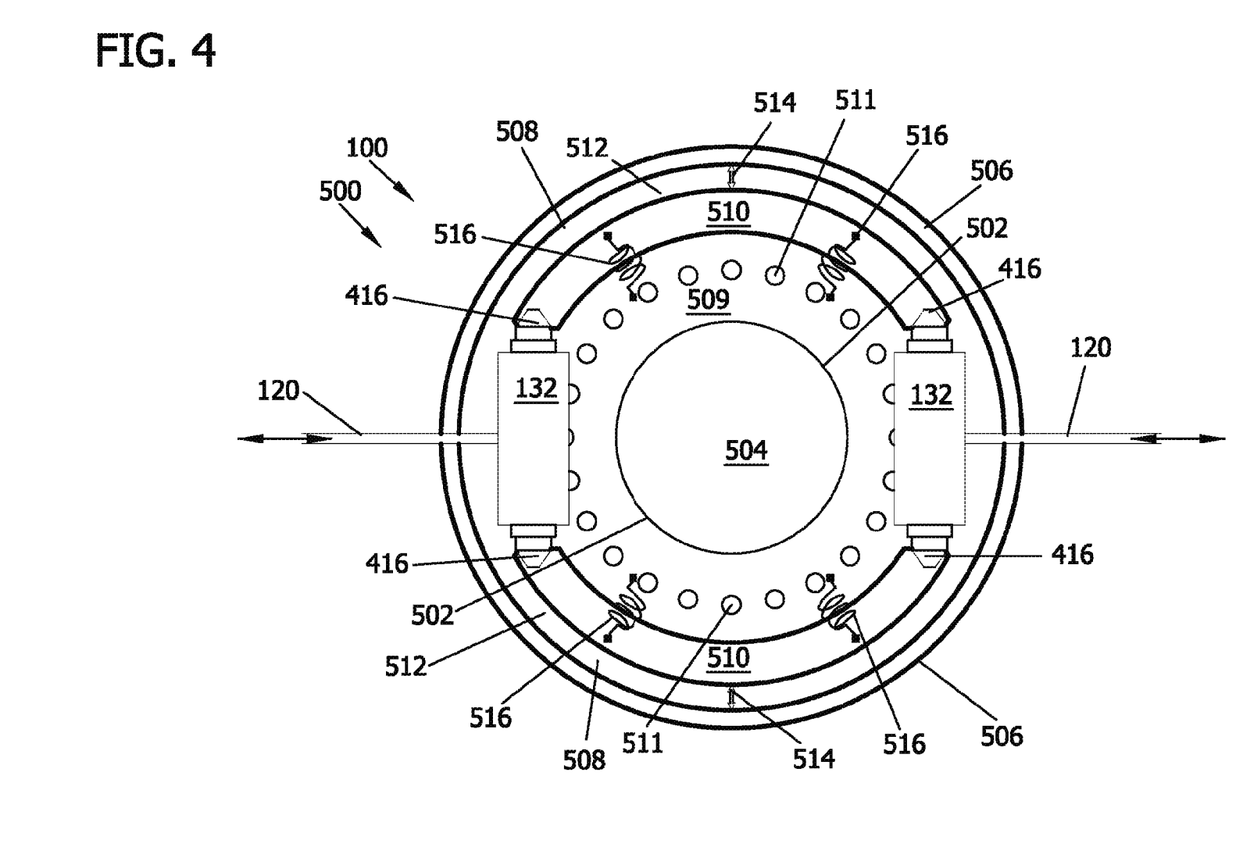
FIG. 4 is a schematic view of an exemplary braking mechanism that may be used with the vehicle anti-lock braking system shown in FIG. 1.

FIG. 4 is a schematic view of an exemplary braking mechanism 500 that may be used with vehicle anti-lock braking system 100. Mechanism 500 is a braking mechanism and includes an axle housing wall 502 that at least partially defines an axle cavity 504 where cavity 504 is sized to receive at least a portion of axle 204 (shown in FIG. 6). Mechanism 500 also includes a brake drum 506 that is substantially arcual and includes a radially inner surface 508. Brake drum 506 is rotatably coupled to a portion of axle 204 of the vehicle and is configured to rotate with axle 204 and wheels 112 (shown in FIG. 1).

Mechanism 500 further includes a spider portion, or brake ring 509 that defines a plurality of holes 511. Mechanism 500 also includes a plurality of substantially arcual brake shoes 510 that are coupled to spider portion 509. Each of brake shoes 510 include a radially inner surface, or lining 512. Linings 512 and surface 508 are configured such that contact of linings 512 with surface 508 induces a stopping force on the vehicle. Typically, during periods where braking action is not employed, linings 512 and surface 508 are maintained at a predetermined distance 514 from each other. Specifically, in the exemplary embodiment, during such periods of operation, distance 514 is maintained within range 0.0 mm to 0.254 mm (0.000 in. to 0.010 in). Linings 512 are configured to facilitate substantially continuous light rubbing with surface 508 within such range of distance 514 while mitigating heat generation and excessive wear. Alternatively, any range for distance 514 is used that enables operation of system 100 as described herein. Mechanism 500 also includes plurality of brake actuators 132 coupled to brake shoes 510 through pistons 408 and 410 (shown in FIG. 3), or more specifically, piston extensions 416. As discussed above, fluid conduits 120 are coupled in flow communication with brake actuators 132 and AHBA 114 (shown in FIGS. 1 and 2).

Mechanism 500 further includes a plurality of brake springs 516, where each of springs 516 is coupled to brake ring 509 and one of brake shoes 510. Springs 516 are configured to induce the first bias within system 100. Specifically, springs 516 are configured to induce a force opposite in direction to a force produced by fluid in cavity 402 (shown in FIG. 3) within actuators 132. Shoes 510, conduits 120, actuators 132 and springs 516 are configured to remain substantially rotationally stationary within mechanism 500.

In operation, as an operator depresses the service brake pedal hydraulic fluid in conduits 120 flows into brake actuators 132 and fluid pressure within actuators 132 increases as a function of the degree of depression of the service brake pedal as discussed above. Moreover, piston extensions 416 move outward against the first bias of system 100 induced by springs 516, and brake shoes 510 extend radially outward and distance 514 decreases to zero, if not already attained. Once distance 514 decreases to zero, rotationally stationary linings 512 contact surface 508 of rotating drum 506, and the braking action of the vehicle is generated and a rotational speed of drum 506 decreases. The braking action is proportional to the force exerted between linings 512 and 508 that is proportional to an amount of depression of the service brake pedal and the subsequent hydraulic fluid pressure increase. Therefore, the braking action is proportional to an amount of depression of the service brake pedal.

Similarly, as an operator relaxes depression on the service brake pedal, fluid pressure in conduits 120 decreases and the first bias of system 100 induced by springs 516 induces an inward movement of piston extensions 416. The force exerted between linings 512 and 508 begins to decrease as distance 514 approaches approximately 0.0 mm to 0.254 mm (0.000 in. to 0.010 in.) and the braking action of the vehicle is substantially removed. As discussed above, extended periods of light rubbing between linings 512 and surface 508 at a distance 514 of approximately zero are tolerable. In the event that brake shoes 510 retract radially inward such that distance 514 increases away from zero, rotationally stationary linings 512 break contact with surface 508 of rotating drum 506, and the braking action of the vehicle is completely removed. Moreover, as the first bias of system 100 associated with springs 516 induces an inward movement of piston extensions 416, hydraulic fluid is channeled through conduits 120 to converter 116 through AHBA 114 (both shown in FIG. 1). As hydraulic fluid pressure within cavity 308 of AHBA 114 and within conduit 118 (shown in FIGS. 1 and 2) decreases and valve 310 closes off ports 306 and 304 as described above, a substantially static hydraulic fluid pressure value of approximately 276 kPa to 552 kPa (40 psi to 80 psi) is maintained within conduits 120.

Such residual pressure facilitates maintaining distance 514 within the range 0.0 mm to 0.254 mm (0.000 in. to 0.010 in.).

Also, in operation, at least one of the plurality of wheel speed sensors 108 senses a reduction in the rotational speed of corresponding trigger wheel 126 (both shown in FIG. 1). When the sensed rotational speed reaches a predetermined threshold, at least one wheel speed sensor 108 transmits a corresponding signal to control unit 102 (shown in FIG. 1). Control unit 102 then actuates at least one of the plurality of pressure regulating devices 104 inducing a decrease in fluid pressure within respective conduit 118 that is transmitted to respective AHBA 114. More specifically, the decrease in fluid pressure within respective conduit 118 is transmitted to valve seating surface 316 of valve seat 312 through port 302 (all shown in FIG. 2). Accordingly, the second bias, that is proportional to a predetermined surface area of beveled surface 314 (shown in FIG. 2) and the pressure of the hydraulic fluid contacting surface 314, decreases due to the decrease in fluid pressure. The third bias, as a function of at least partially compressed spring 320, induces an upward, or closing, force which tends to induce an upward, or closing, movement of valve 310 (both shown in FIG. 2). Moreover, actuating at least one of pressure regulating devices 104 induces a decrease in the fluid pressure exerted within respective conduits 120 until ports 304 and 306 (both shown in FIG. 2) are covered. Hydraulic fluid is channeled through conduits 118, 120, and 124 to hydraulic fluid reservoir 122 through respective AHBA 114 (all shown in FIG. 1) and the first bias of system 100, induced by springs 516, induces an inward movement of piston extensions 416 such that the braking action of the vehicle is reduced.

Figure 5:
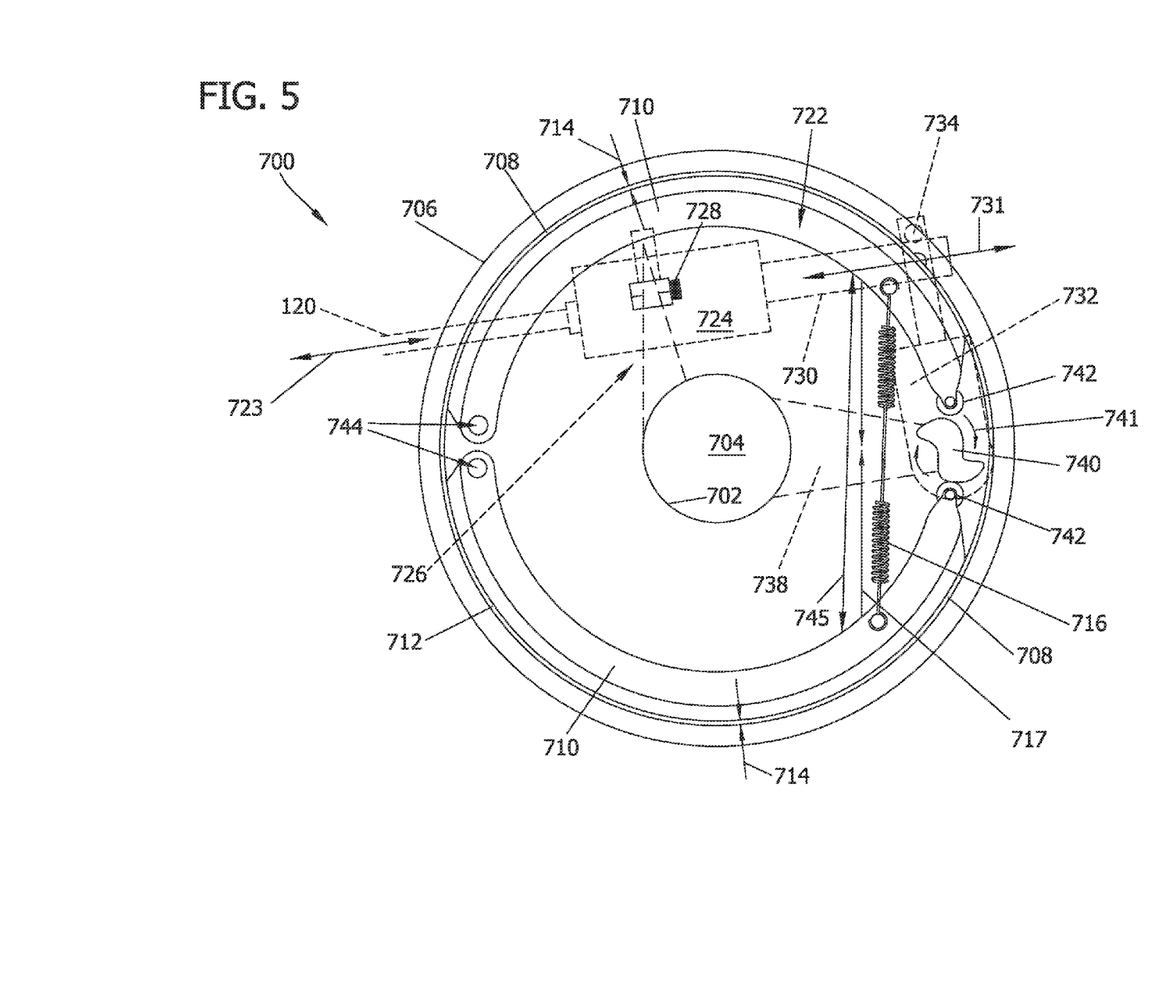
FIG. 5 is a schematic view of an alternative braking mechanism that may be used with the vehicle anti-lock braking system shown in FIG. 1.
Figure 6:
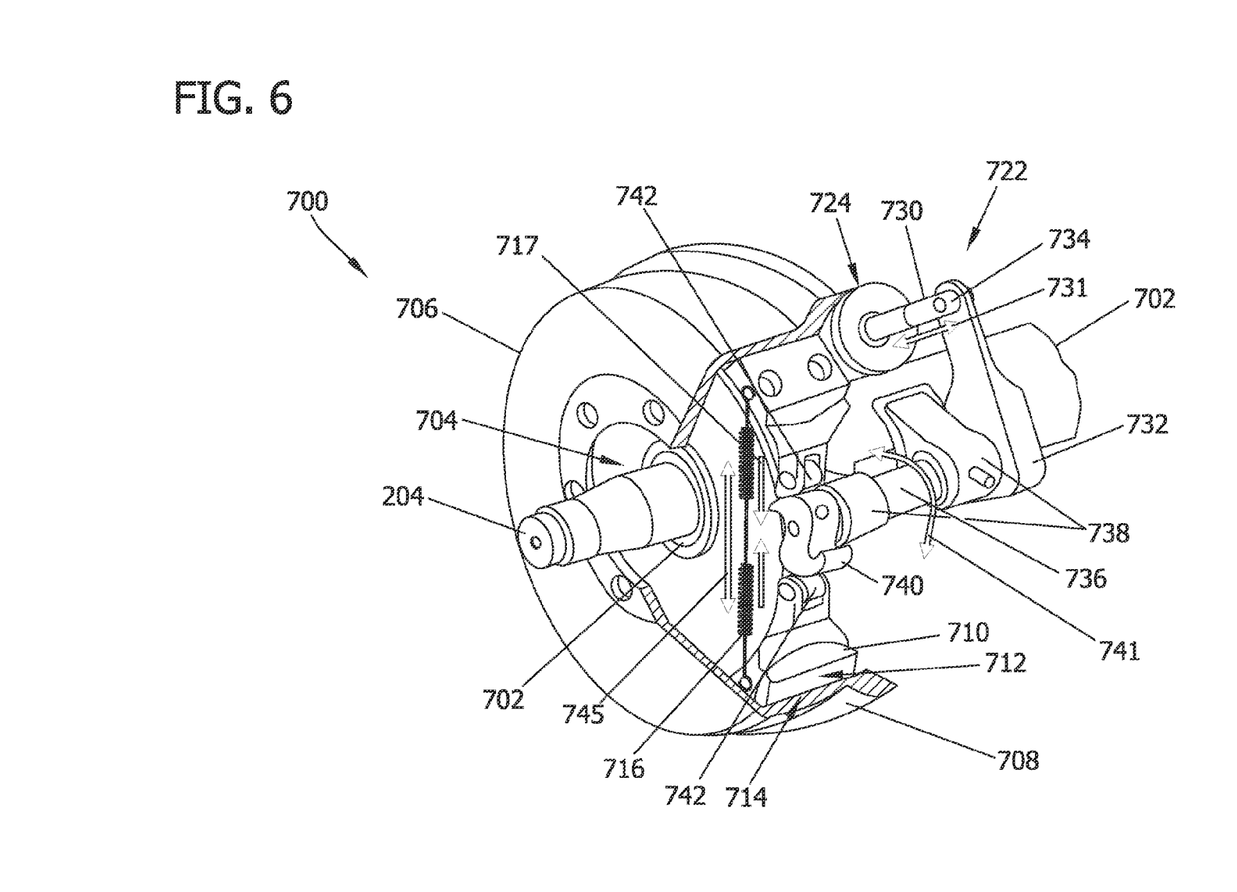
FIG. 6 is an orthographic view of the alternative braking mechanism shown in FIG. 5.

FIG. 5 is a schematic view of an alternative braking mechanism 700 that may be used with vehicle anti-lock braking system 100. FIG. 6 is an orthographic view of alternative braking mechanism 700. Mechanism 700 is similar to mechanism 500 where mechanism 700 includes an axle tube 702 that at least partially defines an axle cavity 704 where cavity 704 is sized to receive at least a portion of axle 204. Mechanism 700 also includes a brake drum 706 that is substantially arcual and includes a radially inner surface 708. Brake drum 706 is rotatably coupled to a portion of axle 204 of the vehicle and is configured to rotate with axle 204 and wheels 112 (shown in FIG. 1).

Mechanism 700 further includes a plurality of substantially arcual brake shoes 710. Each of brake shoes 710 include a radially inner surface, or lining 712. Linings 712 and surface 708 are configured such that contact of linings 712 with surface 708 induces a stopping force on the vehicle. Typically, during periods where braking action is not employed, linings 712 and surface 708 are maintained at a predetermined distance 714 from each other. Specifically, in the exemplary embodiment, during such periods of operation, distance 714 is maintained within range 0.0 mm to 0.254 mm (0.000 in. to 0.010 in.). Linings 712 are configured to facilitate substantially continuous light rubbing with surface 708 within such range of distance 714 while mitigating heat generation and excessive wear. Alternatively, any range for distance 714 is used that enables operation of system 100 as described herein.

Mechanism 700 differs from mechanism 500 in that mechanism 700 is an S-Cam-type braking mechanism that includes an alternative brake actuator 722 coupled to brake shoes 710 as discussed further below. In these alternative embodiments, alternative actuators can be used in place of exemplary actuators 132 (shown in FIGS. 3 and 4). Therefore, fluid conduits 120 are coupled in flow communication with each brake actuator 722 and AHBA 114 (shown in FIGS. 1 and 2) where fluid enters and leaves actuator 722 as illustrated by arrows 723.

In this alternative embodiment, each brake actuator 722 is an S-Cam-type brake actuator. As such, actuator 722 includes a hydraulic cylinder 724, where cylinder 724 is coupled in flow communication with conduit 120. Moreover, cylinder 724 is fixedly coupled to axle tube 702 through a cylinder mounting bracket 726 with mounting hardware 728, where bracket 726 is fixedly coupled to tube 702 through methods that include, but are not limited to, welding. Cylinder 724 includes a cylinder arm 730 that is configured to convert a change in pressure within conduit 120 into a change in position of arm 730 in a direction that is substantially axial to cylinder 724 as illustrated by arm position arrows 731.

Actuator 722 also includes a brake arm 732 coupled to cylinder arm 730 through retention hardware 734. Brake arm 732 is rotatably coupled to a cam shaft 736 through standard mechanical coupling methods. Cam shaft 736 is axially aligned by a plurality of cam shaft guide brackets 738, where each bracket 738 is fixedly coupled to tube 702. Actuator 722 further includes a brake cam 740 rotatably coupled to cam shaft 736 such that clockwise and counter-clockwise rotation of shaft 736 translates into similar rotation of cam 740 as illustrated by cam rotational arrows 741.

Actuator 722 also includes two cam rollers 742, where each roller 742 is coupled to each brake shoe 710. Each roller 742 facilitates contact of brake cam 740 with rollers 742 while mitigating wear of rollers 742 and cam 740 throughout periods of contact of cam 740 with rollers 742. Actuator 722 further includes a plurality of shoe pivot pins 744 that extend at least partially into brake drum 706, where each pin 744 facilitates lateral support for each associated brake shoe 710 and facilitates predetermined radially inward and outward movement of shoe 710 away from and toward, respectively, brake drum 706 as illustrated by shoe movement arrows 745. Actuator 722 also includes a brake spring assembly 716 where assembly 716 is coupled each brake shoe 710. Similar to springs 516 (shown in FIG. 4) spring assembly 716 is configured to induce the first bias within system 100. Specifically, spring assembly 716 is configured to induce a radially inward force opposite in direction to a force produced by cam 740 contacting rollers 742 and radially expanding shoes 710 outward within actuator 722. Such radially inward force is illustrated by spring bias arrows 717. Shoes 710, conduits 120, and actuator 722 are configured to remain substantially rotationally stationary within mechanism 700.

Referring to FIGS. 5 and 6, in operation, as an operator depresses the service brake pedal hydraulic fluid in conduits 120 flows into brake actuator 722, or, more specifically, in hydraulic cylinder 724 as shown by arrow 723, and fluid pressure within cylinder 724 increases as a function of the degree of depression of the service brake pedal as discussed above. Moreover, cylinder arm 730 extends outward against the first bias of mechanism 700 induced by spring assembly 716 as shown by arrow 731. The outward motion of arm 730 is transferred to cam shaft 736 through brake arm 732 and cam shaft 736 rotates in the clockwise direction as shown by arrow 741. Such clockwise rotation of cam shaft 736 rotates brake cam 740 in the clockwise direction such that cam 740 contacts rollers 742 and each of brake shoes 710 pivot about pins 744 and extend radially outward as shown by arrow 745 and distance 714 decreases to zero, if not already attained. As shoes 710 extend radially outward, spring assembly 716 is also extended such that the first bias, as indicated by arrows 717, is increased. Once distance 714 decreases to zero, rotationally stationary linings 712 contact surface 708 of rotating drum 706, and the braking action of the vehicle is generated and a rotational speed of drum 706 decreases. The braking action is proportional to the force exerted between linings 712 and surface 708 that is proportional to an amount of depression of the service brake pedal and the subsequent hydraulic fluid pressure increase. Therefore, the braking action is proportional to an amount of depression of the service brake pedal.

Similarly, as an operator relaxes depression on the service brake pedal, fluid pressure in conduits 120 decreases, and cylinder arm 730 retracts into hydraulic cylinder 724 which facilitates counter-clockwise rotation of cam shaft 736 and brake cam 740 through brake arm 732. As cam 740 rotates against rollers 742, the first bias of mechanism 700 induced by spring assembly 716 induces a radially inward movement of shoes 710. The force exerted between linings 712 and surface 708 begins to decrease as distance 714 approaches approximately 0.0 mm to 0.254 mm (0.000 in. to 0.010 in.) and the braking action of the vehicle is substantially removed. As discussed above, extended periods of light rubbing between linings 712 and surface 708 at a distance 714 of approximately zero are tolerable. In the event that brake shoes 710 retract radially inward such that distance 714 increases away from zero, rotationally stationary linings 712 break contact with surface 708 of rotating drum 706, and the braking action of the vehicle is completely removed. Moreover, hydraulic fluid is channeled through conduits 120 to converter 116 through AHBA 114 (shown in FIGS. 1 and 2). As hydraulic fluid pressure within cavity 308 of AHBA 114 and within conduit 118 (shown in FIGS. 1 and 2) decreases and valve 310 closes off ports 306 and 304 as described above, a substantially static hydraulic fluid pressure value of approximately 276 kPa to 552 kPa (40 psi to 80 psi) is maintained within conduits 120. Such residual pressure facilitates maintaining distance 514 within the range 0.0 mm to 0.254 mm (0.000 in. to 0.010 in.).

Also, in operation, at least one of the plurality of wheel speed sensors 108 senses a reduction in the rotational speed of corresponding trigger wheel 126 (both shown in FIG. 1). When the sensed rotational speed reaches a predetermined threshold, at least one wheel speed sensor 108 transmits a corresponding signal to control unit 102 (shown in FIG. 1). Control unit 102 then actuates at least one of the plurality of pressure regulating devices 104 inducing a decrease in fluid pressure within respective conduit 118 that is transmitted to respective AHBA 114. More specifically, the decrease in fluid pressure within respective conduit 118 is transmitted to valve seating surface 316 of valve seat 312 through port 302 (all shown in FIG. 2). Accordingly, the second bias, that is proportional to a predetermined surface area of beveled surface 314 (shown in FIG. 2) and the pressure of the hydraulic fluid contacting surface 314, decreases due to the decrease in fluid pressure. The third bias, as a function of at least partially compressed spring 320, induces an upward, or closing, force which tends to induce an upward, or closing, movement of valve 310 (both shown in FIG. 2). Moreover, actuating at least one of pressure regulating devices 104 induces a decrease in the fluid pressure exerted within respective conduits 120 until ports 304 and 306 (both shown in FIG. 2) are covered. Hydraulic fluid is channeled through conduits 118, 120, and 124 to hydraulic fluid reservoir 122 through respective AHBA 114 (all shown in FIG. 1) and the first bias of mechanism 700, induced by spring assembly 716, induces a radially inward movement of shoes 710 such that the braking action of the vehicle is reduced.

While mechanism 700 can be factory installed on new vehicles, current vehicles may be retrofitted with mechanism 700 as well. For example, on some models of standard service brakes (not shown), an associated slack adjuster and air chamber (neither shown) are removed, actuator 722 is installed, and conduit 120 is run to hydraulic cylinder 724.

The systems and method as described herein facilitate providing anti-lock braking functionality to vehicles having vehicle anti-lock braking systems. Specifically, the vehicle anti-lock braking systems as described above facilitate decreasing a potential for establishing a lock-up condition where rotation of at least one wheel of a vehicle is substantially diminished. Also, the system is configured to be compatible with vehicles having service braking systems that include an AHBA.

Exemplary embodiments of vehicle braking systems are described above in detail. The methods, apparatus and systems are not limited to the specific embodiments described herein nor to the specific illustrated vehicle braking systems.

While the invention has been described in terms of various specific embodiments, those skilled in the art will recognize that the invention can be practiced with modification within the spirit and scope of the claims.

What is claimed is:

1. A vehicle anti-lock braking system comprising:
at least one automatic hydraulic brake adjuster (AHBA) coupled in flow communication with at least one braking mechanism configured to interact with a vehicle wheel, said at least one AHBA comprising:
a valve; and
at least one biasing device coupled to said valve, wherein said valve and said at least one biasing device cooperate to:
channel two-way fluid flow through said valve when said valve is in an open position to facilitate dynamic modulation of the braking mechanism and braking action therefrom; and
facilitate maintenance of a predetermined fluid pressure downstream of said valve at least partially as a result of the two-way fluid flow when said valve is in a closed position;
at least one pressure regulating device coupled in flow communication with said at least one AHBA, said at least one pressure regulating device configured to regulate brake actuating pressure applied to said at least one braking mechanism through said at least one AHBA;
at least one wheel speed sensor coupled to the vehicle wheel, said at least one wheel speed sensor configured to sense a rotational speed of the vehicle wheel; and
a control unit communicatively coupled to said at least one pressure regulating device and said at least one wheel speed sensor, said control unit configured to actuate said at least one pressure regulating device at least partially as a function of the rotational speed of the vehicle wheel.

2. The vehicle anti-lock braking system in accordance with claim 1, wherein said control unit is configured to receive a signal substantially representative of a value of the rotational speed of the vehicle wheel from said at least one wheel speed sensor.

3. The vehicle anti-lock braking system in accordance with claim 1, wherein said at least one wheel speed sensor is configured to transmit a signal to said control unit when the rotational speed of the vehicle wheel reaches a predetermined speed.

4. The vehicle anti-lock braking system in accordance with claim 3, wherein said control unit is further configured to actuate said at least one pressure regulating device when the rotational speed of the vehicle wheel reaches the predetermined speed.

5. The vehicle anti-lock braking system in accordance with claim 1, wherein said at least one wheel speed sensor comprises a trigger wheel.

6. The vehicle anti-lock braking system in accordance with claim 1, wherein said at least one pressure regulating device is configured to regulate brake actuating pressure by channeling braking fluid through said at least one pressure regulating device when said at least one pressure regulating device is in an open position.

7. The vehicle anti-lock braking system in accordance with claim 1, wherein said at least one braking mechanism is coupled in flow communication with a fluid reservoir.

8. The vehicle anti-lock braking system in accordance with claim 1, wherein said control unit is further configured to actuate said at least one pressure regulating device to facilitate decreasing a potential for establishing a lock-up condition wherein rotation of the vehicle wheel is substantially diminished.

9. The vehicle anti-lock braking system in accordance with claim 1, wherein said vehicle anti-lock braking system is configured to be installed as a retrofit package on vehicles currently in service.

10. A method of assembling a vehicle anti-lock braking system comprising:
    assembling at least one automatic hydraulic brake adjuster (AHBA) comprising:
        forming a valve body that defines a cavity therein;
        inserting a valve in the cavity; and
        coupling at least one biasing device to the valve;
    coupling the at least one AHBA in flow communication with at least one braking mechanism configured to interact with a vehicle wheel;
    adjusting the at least one biasing device such that the valve and the at least one biasing device cooperate to:
        channel two-way fluid flow through the valve when the valve is in an open position to facilitate dynamic modulation of the braking mechanism to induce braking action therefrom; and
        facilitate maintenance of a predetermined fluid pressure downstream of the valve at least partially as a result of the two-way fluid flow when the valve is in a closed position;
    coupling at least one pressure regulating device in flow communication with the at least one AHBA;
    positioning at least one wheel speed sensor proximate the vehicle wheel such that the at least one wheel speed sensor is configured to transmit signals substantially representative of a rotational speed of the vehicle wheel; and
    coupling a control unit in communication with the at least one pressure regulating device and the at least one wheel speed sensor.

11. The method in accordance with claim 10 further comprising configuring the control unit to actuate the at least one pressure regulating device at least partially as a function of the rotational speed of the vehicle wheel.

12. The method in accordance with claim 10 further comprising coupling at least one fluid reservoir in flow communication with the at least one pressure regulating device.

13. The method in accordance with claim 10, wherein positioning at least one wheel speed sensor comprises coupling a trigger wheel to the vehicle wheel.

14. A vehicle comprising:
    a plurality of vehicle wheels; and
    an anti-lock braking system comprising:
        at least one automatic hydraulic brake adjuster (AHBA) coupled in flow communication with at least one braking mechanism configured to interact with a vehicle wheel of said plurality of vehicle wheels, said at least one AHBA comprising:
            a valve; and
            at least one biasing device coupled to said valve, wherein said valve and said at least one biasing device cooperate to:
                channel two-way fluid flow through said valve when said valve is in an open position to facilitate dynamic modulation of the braking mechanism and braking action therefrom; and
                facilitate maintenance of a predetermined fluid pressure downstream of said valve at least partially as a result of the two-way fluid flow when said valve is in a closed position;
        at least one pressure regulating device coupled in flow communication with said at least one AHBA, said at least one pressure regulating device configured to regulate brake actuating pressure applied to said at least one braking mechanism through said at least one AHBA;
        at least one wheel speed sensor coupled to said at least one pressure regulating device and said vehicle wheel, said at least one wheel speed sensor configured to sense a rotational speed of said vehicle wheel; and
        a control unit communicatively coupled to said at least one pressure regulating device and said at least one wheel speed sensor, said control unit configured to actuate said at least one pressure regulating device at least partially as a function of the rotational speed of said vehicle wheel.

15. The vehicle in accordance with claim 14, wherein said control unit is further configured to receive a signal substantially representative of a value of the rotational speed of said vehicle wheel from said at least one wheel speed sensor.

16. The vehicle in accordance with claim 14, wherein said at least one wheel speed sensor is configured to transmit a signal to said control unit when the rotational speed of said vehicle wheel reaches a predetermined speed.

17. The vehicle in accordance with claim 16, wherein said control unit is further configured to actuate said at least one pressure regulating device when the rotational speed of said vehicle wheel reaches the predetermined speed.

18. The vehicle in accordance with claim 14, wherein said at least one wheel speed sensor comprises a trigger wheel.

19. The vehicle in accordance with claim 14, wherein said at least one pressure regulating device is configured to regulate brake actuating pressure by channeling braking fluid through said at least one pressure regulating device when said at least one pressure regulating device is in an open position.

20. The vehicle in accordance with claim 14, wherein said control unit is further configured to actuate said at least one pressure regulating device to facilitate decreasing a potential for establishing a lock-up condition wherein rotation of said vehicle wheel is substantially diminished.

* * * * *